United States Patent [19]
Fuks

[11] 3,879,460
[45] Apr. 22, 1975

[54] SYNTHESIS OF MONO-, DI-, AND TRI-SUBSTITUTED AMIDINES

[75] Inventor: Robert Fuks, Brussels, Belgium

[73] Assignee: Union Carbide Corporation, New York, N.Y.

[22] Filed: May 8, 1973

[21] Appl. No.: 358,356

[52] U.S. Cl.......... 260/564 R; 260/239.87; 260/464; 260/465 R; 260/465 F; 260/465 G; 260/465.1; 260/465.6; 260/465.7
[51] Int. Cl........................................... C07c 123/00
[58] Field of Search......... 260/564 R, 465 R, 465.1, 260/465.9, 293.87, 464, 465 F, 465 G, 465.6

[56] References Cited
OTHER PUBLICATIONS
Gordon et al., J. Org. Chem., Vol. 24, pp. 269-271 (1959).

Primary Examiner—Leon Zitver
Assistant Examiner—Gerald A. Schwartz
Attorney, Agent, or Firm—Israel Blum

[57] ABSTRACT

N-substituted amidines are synthesized by the novel process comprising successively contacting with a nitrile compound (a) a Lewis acid catalyst, (b) an alkyl halide and (c) an amine. The N-substituted amidines produced are strong bases and thus useful for a wide variety of applications.

7 Claims, No Drawings

SYNTHESIS OF MONO-, DI-, AND TRI-SUBSTITUTED AMIDINES

This invention relates to a novel process for the synthesis of mono-, di- and tri-substituted amidines.

Heretofore, a variety of reactions involving N-substituted amidines have been reported in the literature. For example, it is well known that N-substituted amidines may be prepared by boiling N-substituted amides with an amine in phosphorous trichloride solution. Additionally, J. E. Gordon and G. C. Turrel, *J. Org. Chem.* 24, 269 (1959) reported the preparation of N-methyl -N'-phenyl acetamidine by treating the N-Alkyl nitrilium salt, N-methyl acetonitrilium, with aniline and Wilson, Wagner and Weingarter, *J. Org. Chem.* 36, 1613–15 (1971) reported N-substituted amidines containing dimethylamino groups.

Recently it has been discovered that a wide variety of mono-, di-, and tri-substituted amidines can be conveniently synthesized by successively contacting with a nitrile compound (a) a Lewis acid catalyst, (b) an alkyl halide and (c) an amine. In many instances, the yield of the desired mono-, di-, and tri-substituted amidines is high, sometimes nearly quantitative. Moreover, the starting materials are readily available and hence mono-, di-, and tri-substituted amidines can be obtained readily in a one pot synthesis.

Accordingly, one or more of the following objects will be achieved by the practice of the instant invention. It is an object of this invention to provide a novel process for the synthesis of mono-, di-, and tri-substituted amidines. Another object of the invention is to provide a novel process for synthesizing mono-, di-, and tri-substituted amidines in good yield. These and other objects will readily become apparent to those skilled in the art in the light of the teaching herein set forth.

The four steps of the novel process can be illustrated by the following four reactions:

The first step of the novel process comprises the contacting of a Lewis acid catalyst with a nitrile compound. In reaction (1), R represents a hydrocarbyl group containing up to 18 carbon atoms, more preferably containing up to 12 carbon atoms and most preferably containing up to 6 carbon atoms. Particularly preferred nitriles which can be employed in the process of this invention are those wherein the R group represented includes an alkyl, alkenyl, aryl, alkaryl, aralkyl, cycloalkyl, cycloalkenyl, bicycloalkyl and the like. Most preferred nitrile compounds which can be employed in the process of this invention include acetonitrile, propionitrile, butyronitrile, pentonitrile, hexanitrile, octonitrile, benzonitrile, 2-naphthonitrile and the like.

Illustrative Lewis acid catalysts which can be employed in the process of this invention include, among others, ferric chloride, boron trifluoride, stannic chloride and the like.

In the second step of the process of this invention, formula (II) represents the reaction product produced in the first step of this novel process and $R_1X$ represents an alkyl halide. $R_1$ represents an alkyl group preferably containing up to 18 carbon atoms, more preferably containing up to 12 carbon atoms and most preferably containing up to 6 carbon atoms.

Preferred alkyl halides which can be employed in the process of this invention include those wherein $R_1$ represents t-butyl, ispropyl, n-hexyl, n-pentyl and the like, and X represents halides such as chloride, bromide and the like.

In the third step of the process of this invention, formula (III) represents the reaction product of step two of the process of this invention. In the amines employed in this step, the $R_2$ and $R_3$ groups preferably each contain up to 18 carbon atoms, more preferably containing up to 12 carbon atoms and most preferably containing up to 6 carbon atoms. Particularly preferred amines which can be employed in the process of this invention

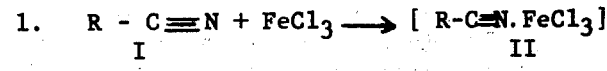

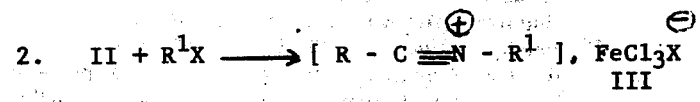

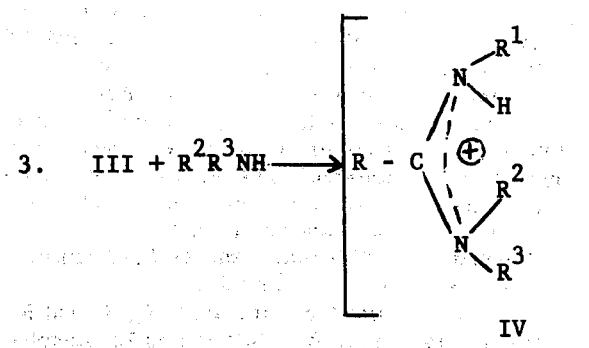

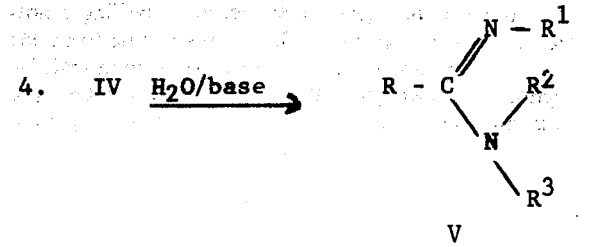

include those where the $R_2$ and $R_3$ groups represented each include a hydrogen atom, an alkyl, alkenyl, aryl, alkaryl, aralkyl, cycloalkyl, cycloalkenyl, bicycloalkyl, haloalkyl, haloaryl, haloalkaryl, pyridyl, hydroxyalkyl, hydroxyaryl group and the like.

Illustrative amines which can be employed in the process of this invention include among others, ammonia, aniline, methylamine, diethylamine, m-toluidine, 2,3-xylidine, p-anisidine and the like.

In the fourth step of the process of this invention, formula (IV) represents the reaction product of step three of the process of this invention and formula (V) represents the structural formula for the mono-, di-, and tri-substituted amidines produced by the process of this invention, wherein R, $R_1$, $R_2$ and $R_3$ have the same values as previously indicated.

The first three steps of the reaction process of this invention can be conducted in the presence of a solvent which is inert to the reactants and which is easily separated from the product. Suitable solvents which can be employed are the normally liquid, inert organic solvents, such as, the halogenated hydrocarbons, heterocyclic compositions, and the like. Illustrative solvents include, among others, benzene, carbon tetrachloride, methylene chloride, chlorobenzene, cyclohexane and the like. The fourth step of the process of this invention can be conducted in the presence of water or a suitable base solution such as a solution containing sodium hydroxide, potassium hydroxide or the like.

The temperature at which the reaction can be conducted is 0°C but this is not necessarily critical and the reaction can be effected at temperatures ranging from about 0° to about 50°C. Pressure is not necessarily critical and the process can be effected under atmospheric subatmospheric or superatmospheric conditions.

Formation of the mono-, di-, and tri-substituted amidines in good yield generally takes a few hours up to several days on the particular temperature, solvent and reactants.

The proportion in which the reactants are utilized can vary broadly, and does not limit the invention. Typically, equimolor proportions of the reactants are employed. Higher or lower proportions of the reactants can also be employed satisfactorily. However, the efficient utilization of the reactants will generally decrease when greater then stoichiometric, i.e., equimolor proportions are employed.

Upon completion of the reaction, the mono-, di-, and tri-substituted amidine product can be recovered in any convenient manner. For example, the product can be recovered as the residue obtained upon the evaporation or distillation of any unreacted material and/or solvent present.

The substituted amidines prepared by the process of this invention are more stable than unsubstituted amidines and are useful as bases.

Due to their strong basic characteristics, the amidines prepared by the process of this invention are useful for a wide variety of applications. For example, they can be employed in small amounts to neutralize or render basic solutions employed in dyeing of fibers and fabrics. Furthermore, it is known that certain species of the substituted amidines represented by formula (V), which can be synthesized by the process of this invention, have medical applications. For example, phenacaine hydrochloride is used as a local anesthetic and stilbamidine and other diamidines have been used in the treatment of sleeping sickness and other protozoal infections.

The following examples are illustrative of the invention:

EXAMPLES 1–11

In the following examples, the mono-, di-, and tri-substituted amidines were synthesized, as previously described, using isopropyl chloride as the alkyl halide in step two of the process of this invention.

16.4 g. (0.101 mols) of $FeCl_3$ in 40 ml of isopropyl chloride and 4.5 g. (0.101 mols) of acetonitrile was contained in a suspension and kept at 0°C. for 3 hours duration. The excess of isopropyl chloride was then removed by evaporation to dryness, the nitrilium salt (III) was taken up in 20 ml of methylene chloride, and the amine (0.095 mols) in 10 to 50 ml of methylene chloride was added dropwise to that suspension, (III).

The reaction mixture was kept 2 hours at room temperature, and the methylene chloride was then removed by evaporation to dryness. The residue, which was the amidinium salt (IV), was taken up in water. 30 percent aqueous NaOH (0.45 mols) was added to the mixture at 0°C., and the mixture was extracted with ether. The ethereal extracts were dried, concentrated and either distilled through a three-bubble tube under high vacuum or, in the case of the solid products, recrystallized from petroleum ether with methanol being added as necessary to effect solution.

It should be noted that in the first step of the novel process, acetonitrile was used in examples 1–8 while benzonitrile was used in examples 9–11.

EXAMPLES 12–22

In examples 12–22, t-butyl chloride was used as the aklyl halide in step 2 of the process of this invention.

5.85 g. (0.145 mols) of acetonitrile were added at 0°C. to 23.1g. (0.145 mols of $FeCl_3$ in 40 ml. of methylene chloride. After 15 minutes, 13.4 g. (0.145 mols) of t-butyl chloride were added and the reaction mixture was kept 30 minutes at 0°C. during which time the nitrilium salt (III) was formed. Then depending on the solubility of the amine, 0.135 mols of the amine in 10 to 100 ml of methylene chloride was added dropwise to the reaction mixture by keeping the temperature below 0°C. for 1–2 hours. The solvent was then evaporated off, the residue (IV) was taken up in water and 4.5 moles of a 30 percent aqueous NaOH solution (4.5 mols for each mol of nitrilium salt) was added with ice water cooling. The amidine (V) was then extracted with ether. The organic extract was dried, concentrated and either distilled through a three-bubble tube under high vacuum or, in the case of amidines 16 and 20, purified by recrystallization from pentane.

It should be noted that in examples 21–22 benzonitrile was used in place of acetonitrile.

Table A sets forth the particular R, $R_1$, $R_2$ and $R_3$ groups employed in each of the foregoing 22 examples and the resulting yields and melting or boiling points for each composition. Table B sets forth the formulae for the particular mono-, di-, or tri-substituted amidine synthesized in each of the foregoing 22 examples and the results of elemental analysis for each composition

TABLE A

Table 1
Overall yields in N-substituted amidines V obtained from a nitrile.

| V. N° | R | R¹ | R² | | R³ | m.p. (°C) b.p.(°C/Torr) | Yield % |
|---|---|---|---|---|---|---|---|
| 1 | $CH_3$ | $CH(CH_3)_2$ | | $(CH_2)_5$ | | 95–100/0.1 | 78 |
| 2 | $CH_3$ | $CH(CH_3)_2$ | H | | $C_6H_5$ | 86 | 57–67 |
| 3 | $CH_3$ | $CH(CH_3)_2$ | H | | $C_6H_4$—pCl | 87 | 71 |
| 4 | $CH_3$ | $CH(CH_3)_2$ | H | | $C_6H_3$—m,p,diCl | 94 | 70 |
| 5 | $CH_3$ | $CH(CH_3)_2$ | H | | $C_6H_3$–oCH₃–pCl | 120 | 62–70 |
| 6 | $CH_3$ | $CH(CH_3)_2$ | H | | $C_6H_4$—pOCH₃ | 97 | 60 |
| 7 | $CH_3$ | $CH(CH_3)_2$ | H | | $C_6H_4$—mOH | 156 | 20–30 |
| 8 | $CH_3$ | $CH(CH_3)_2$ | H | | H | 25–34 | 30 |
| 9 | $C_6H_5$ | $CH(CH_3)_2$ | $C_2H_5$ | | $C_2H_5$ | 100/0.1 | 80 |
| 10 | $C_6H_5$ | $CH(CH_3)_2$ | | $(CH_2)_5$ | | 160/12 | 70 |
| 11 | $C_6H_5$ | $CH(CH_3)_2$ | H | | $C_6H_5$ | 87 | 77 |
| 12 | $CH_3$ | $C(CH_3)_3$ | $C_2H_5$ | | $C_2H_5$ | 80/12 | 34 |
| 13 | $CH_3$ | $C(CH_3)_3$ | | $(CH_2)_4$ | | 110/17 | 30 |
| 14 | $CH_3$ | $C(CH_3)_3$ | | $(CH_2)_5$ | | 110–115/12 | 40 |
| 15 | $CH_3$ | $C(CH_3)_3$ | | $(CH_2)_2O(CH_2)_2$ | | 118/19 | 38 |
| 16 | $CH_3$ | $C(CH_3)_3$ | H | | H | 72–74 | 30 |
| 17 | $CH_3$ | $C(CH_3)_3$ | H | | $C_6H_5$ | 138/16 | 37 |
| 18 | $CH_3$ | $C(CH_3)_3$ | H | | $C_6H_4$-pCl | 160/16 | 40 |
| 19 | $CH_3$ | $C(CH_3)_3$ | H | | $C_6H_3$-oCH₃-pCl | 104/0.1 | 53–65 |
| 20 | $CH_3$ | $C(CH_3)_3$ | H | | $C_6H_4$-oCOOCH₃ | 54–55 | 50 |
| 21 | $C_6H_5$ | $C(CH_3)_3$ | $C_2H_5$ | | $C_2H_5$ | 90/0.1 | 52 |
| 22 | $C_6H_5$ | $C(CH_3)_3$ | | $(CH_2)_5$ | | 30–31 | 50 |

TABLE B

Table 2
Elementary Analyses of the N-Substituted amidines, V

| V. N° | Formula | M.W. | Calculated | | | | | Found | | | | |
| | | | C | H | N | O | Cl | C | H | N | O | Cl |
|---|---|---|---|---|---|---|---|---|---|---|---|---|
| 1 | $C_{10}H_{20}N_2$ | 168 | 71.37 | 11.98 | 16.65 | — | — | 69.91 | 12.27 | 16.60 | — | — |
| 2 | $C_{11}H_{16}N_2$ | 176 | 74.96 | 9.15 | 15.89 | — | — | 74.95 | 9.20 | 16.03 | — | — |
| 3 | $C_{11}H_{15}ClN_2$ | 210 | 62.7 | 7.13 | 13.28 | — | 16.85 | 62.79 | 7.30 | 13.42 | — | 17.00 |
| 4 | $C_{11}H_{14}Cl_2N_2$ | 245 | 53.8 | 5.72 | 11.42 | — | 29.00 | 54.10 | 5.93 | 11.84 | — | 29.22 |
| 5 | $C_{12}H_{17}N_2Cl$ | 224 | 64.2 | 7.57 | 12.46 | — | 15.80 | 64.13 | 7.41 | 12.20 | — | 15.70 |
| 6 | $C_{12}H_{18}N_2O$ | 206 | 69.87 | 8.80 | 13.58 | 7.76 | — | 69.73 | 8.86 | 13.63 | 7.32 | — |
| 7 | $C_{11}H_{16}N_2O$ | 192 | 68.72 | 8.39 | 14.57 | 8.32 | — | 68.42 | 8.26 | 14.50 | — | — |
| 8* | $C_5H_{12}N_2$ | 100 | 59.96 | 12.08 | 27.97 | — | — | — | — | — | — | — |
| 9 | $C_{14}H_{22}N_2$ | 218 | 77.01 | 10.16 | 12.83 | — | — | 76.85 | 10.28 | 12.72 | — | — |
| 10 | $C_{15}H_{22}N_2$ | 230 | 78.21 | 9.63 | 12.16 | — | — | — | — | — | — | — |
| 11 | $C_{16}H_{18}N_2$ | 238 | 80.63 | 7.61 | 11.75 | — | — | 80.72 | 7.69 | 11.75 | — | — |
| 12 | $C_{10}H_{22}N_2$ | 170 | 70.53 | 13.02 | 16.45 | — | — | 70.72 | 13.36 | 16.53 | — | — |
| 13 | $C_{10}H_{20}N_2$ | 168 | 71.37 | 11.98 | 16.65 | — | — | 70.89 | 12.07 | 16.67 | — | — |
| — | $C_{11}H_{22}N_2$ | 182 | 72.47 | 12.16 | 15.37 | — | — | 71.89 | 12.14 | 14.99 | — | — |
| 15 | $C_{10}H_{20}N_2O$ | 184 | 65.17 | 10.94 | 15.20 | 8.68 | — | 65.23 | 10.81 | 15.27 | 9.01 | — |
| 16* | $C_6H_{14}N_2$ | 114 | 63.11 | 12.36 | 24.53 | — | — | — | — | — | — | — |
| 17 | $C_{12}H_{18}N_2$ | 190 | 75.74 | 9.54 | 14.72 | — | — | 75.39 | 9.76 | 15.22 | — | — |
| 18 | $C_{12}H_{17}N_2Cl$ | 260 | 64.2 | 7.57 | 12.46 | — | 15.8 | 64.58 | 7.76 | 12.30 | — | 15.67 |
| 19 | $C_{13}H_{19}N_2Cl$ | 239 | 65.40 | 7.97 | 11.73 | — | 14.88 | 65.40 | 8.20 | 11.32 | — | — |
| 20 | $C_{14}H_{20}N_2O_2$ | 248 | 67.72 | 8.12 | 11.28 | 12.89 | — | 67.90 | 8.16 | 11.15 | 12.92 | — |
| 21 | $C_{15}H_{24}N_2$ | 232 | 77.53 | 10.41 | 12.06 | — | — | 77.32 | 10.50 | 12.19 | — | — |
| 22 | $C_{16}H_{24}N_2$ | 244 | 78.63 | 9.90 | 11.46 | — | — | 78.42 | 10.05 | 11.34 | — | — |

*The compounds were too volatile for a good elementary analysis.

Although the invention has been illustrated by the preceeding examples, the invention is not to be construed as limited to the materials or conditions employed herein, but rather the invention encompasses the generic area as hereinbefore disclosed. Various modifications amd embodiments of this invention can be made without departing from the spirit and scope thereof.

What is claimed is:

1. A process for the synthesis of a N-substituted amidine in a yield between about 30 per cent and about 80 per cent, said amidine having the formula:

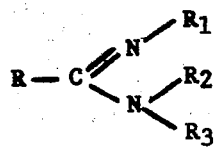

which process comprises the steps of:

a. contacting acetonitrile or benzonitrile with ferric chloride and isoproply chloride or t-butyl chloride to form a nitrilium salt product, the reaction being conducted at a temperature of about 0°C for a time period not exceeding about 3 hours;

b. contacting an amine of the formula:

$$R_2R_3NH$$

with said nitrilium salt product to form a reaction product mixture said reaction product mixture being maintained at a temperature of about 0°C to about 50°C for a time period not exceeding about 2 hours;

c. contacting said reaction product mixture with an aqueous solution of a base; and d. separating a N-substituted amidine from said mixture, wherein R is selected from the group consisting of methyl and phenyl; $R_1$ is selected from the group consisting of isopropyl and t-butyl; and $R_2$ and $R_3$ each represent a group containing up to 12 carbon atoms and each is selected from the group consisting of a hydrogen atom, alkyl, alkenyl, aryl, alkaryl, aralkyl, cycloalkyl, cycloalkenyl, bicycloalkyl, haloalkyl, haloaryl, haloalkaryl, pyridyl, hydroxyalkyl and hydroxyaryl.

2. A process as defined in claim 1 wherein step b is conducted in the presence of a liquid inert organic solvent.

3. A process as defined in claim 2 wherein said solvent is methylene chloride.

4. A process as defined in claim 1 wherein in step a, isopropyl chloride is employed and said reaction temperature is about 0°C.

5. A process as defined in claim 1 wherein in step a, acetonitrile or benzonitrile is contacted with said ferric chloride for a time period not exceeding about 15 minutes to form a ferric chloride complex of said acetonitrile or benzonitrile and then contacting said complex with t-butyl chloride for a time period not exceeding about 30 minutes to form said nitrilium salt product, and wherein in step b, said temperature is about 0°C.

6. A process as defined in claim 1 wherein in step a, acetonitrile is employed.

7. A process as defined in claim 1 wherein in step a, benzontrile is employed.

* * * * *